United States Patent [19]

Nishikata et al.

[11] 4,399,613
[45] Aug. 23, 1983

[54] TWO-LEG VERNIER CALIPERS AND ITS MANUFACTURING METHOD

[75] Inventors: Goro Nishikata; Kozo Shibukawa, both of Kawasaki, Japan

[73] Assignee: Kabushiki Kaisha Mitutoyo Seisakusho, Tokyo, Japan

[21] Appl. No.: 356,032

[22] Filed: Mar. 8, 1982

Related U.S. Application Data

[63] Continuation of Ser. No. 198,062, Oct. 17, 1980, abandoned.

[30] Foreign Application Priority Data

Oct. 23, 1979 [JP] Japan .................................. 54-136842

[51] Int. Cl.³ .............................................. G01B 5/02
[52] U.S. Cl. ................................. 33/143 M; 33/147 T
[58] Field of Search ................. 33/143, 147, 163, 158, 33/159

[56] References Cited

U.S. PATENT DOCUMENTS

| | | | |
|---|---|---|---|
| 1,379,116 | 5/1921 | Malloy | 33/163 |
| 1,621,526 | 3/1927 | Culell | 33/147 T |
| 1,703,736 | 2/1929 | Jacob | 33/143 K |
| 1,878,990 | 9/1932 | Sigsbey et al. | 33/163 |
| 2,846,769 | 8/1958 | Colont | 33/125 R |
| 3,107,433 | 10/1963 | Way | 33/143 K |
| 3,273,249 | 9/1966 | Klaassen | 33/172 R |
| 3,302,294 | 2/1967 | Eguchi | 33/147 T |
| 3,783,523 | 1/1974 | Smith | 33/203.13 |
| 3,864,834 | 2/1975 | Horton | 33/169 R |

FOREIGN PATENT DOCUMENTS

| | | | |
|---|---|---|---|
| 7454 | of 1902 | United Kingdom | 33/143 M |
| 167626 | 8/1921 | United Kingdom | 33/143 K |
| 632671 | 11/1949 | United Kingdom | 33/143 K |

Primary Examiner—Harry N. Haroian
Attorney, Agent, or Firm—Quaintance & Murphy

[57] ABSTRACT

Two-leg vernier calipers characterized in that it consists of a main beam assembly comprising two legs parallel to each other, a vernier assembly supported on the main beam assembly and separate measuring jaws for the main beam and the vernier fitted thereto; each measuring jaw can be selected depending on the type of instrument to be assembled, thereby making it possible to standardize the main beam assembly and the vernier assembly; and accordingly the main beam assembly and the vernier assembly can be made of different materials from the measuring jaws; and the manufacturing method of this two-leg calipers, in which the measuring jaws are fixed at right angles to the two legs of the main beam and the vernier, thus rendering it needless to fit together their measuring surfaces after assembling.

3 Claims, 3 Drawing Figures

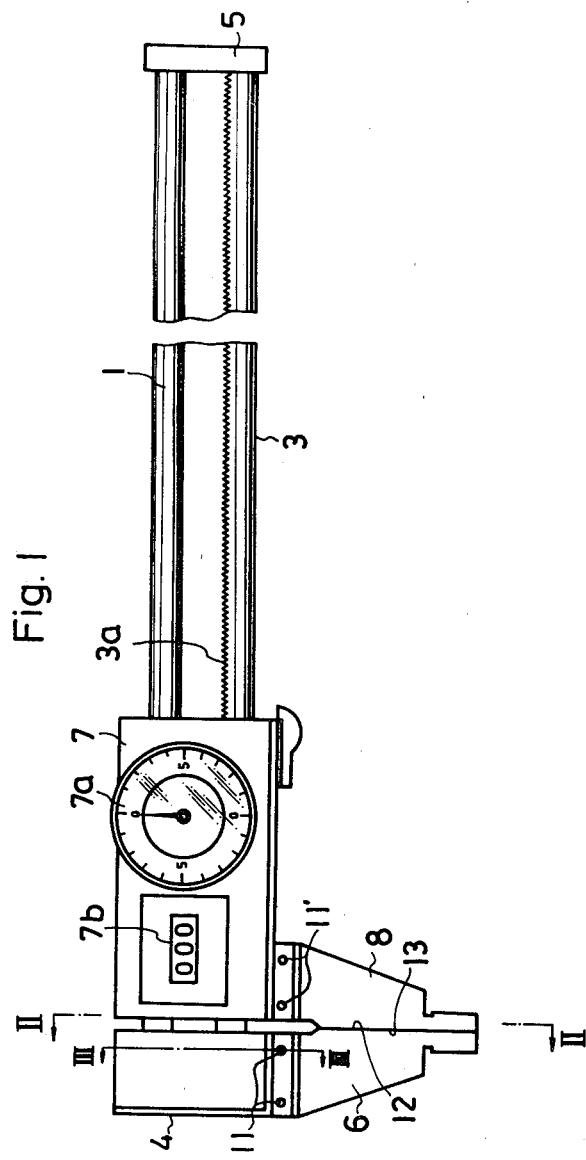
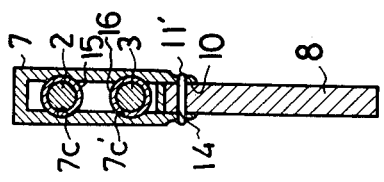
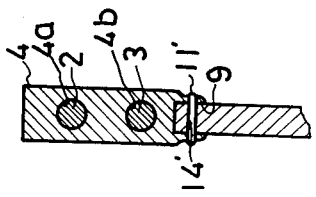

TWO-LEG VERNIER CALIPERS AND ITS MANUFACTURING METHOD

This application is a continuation of U.S. application Ser. No. 198,062, filed Oct. 17, 1980, now abandoned.

BACKGROUND OF THE INVENTION

The present invention relates to a vernier calipers whose main beam assembly comprises two legs, specifically to a vernier calipers which can be manufactured easily in that post-assembly work to finish the measuring surfaces for precision is rendered needless.

The main beam of a vernier calipers is usually composed of a single plate. A vernier calipers of such type that the vernier is slidable along two legs has been proposed, in which the main beam is constituted of two round bars extending parallel to each other between the two stoppers at both extremes so that the number of work steps can be reduced and an error due to the thermal strain in working can be prevented.

In this type of vernier calipers whose main beam assembly consists of two legs, however, an assembling error is liable to occur in the main beam assembly itself and the other components; and thereby it becomes necessary after assembling of the instrument to grind and finish the measuring surfaces of the jaws for precision so that these surfaces of the main beam jaw and vernier jaw may make a plane contact with each other within a plane where the two legs intersect with the measuring surfaces at right angles and this work is so difficult as to call for high skill.

It is common practice to integrate the measuring jaws with the main beam assembly and the vernier assembly. Thus in this type of calipers it has been impossible to select the measuring jaws alone, depending on the type of instrument and accordingly to effect standardization of the main beam assembly and the vernier assembly.

SUMMARY OF THE INVENTION

The primary object of the present invention is to provide a two-leg vernier calipers characterized in that the measuring jaws separately constituted are fixed to the main beam assembly and the vernier assembly, thereby making it possible to select the measuring jaws alone to suit the type of instrument and accordingly to standardize the main beam assembly and the vernier assembly.

Another object of the present invention is to provide a two-leg vernier calipers in which the main beam assembly and the vernier assembly are made of cheap materials like aluminum and only the measuring jaws are made of an anti-wear stainless material.

Still another object of the present invention is to provide a two-leg vernier calipers characterized in that a groove running in the slidable direction of the vernier is cut on the main beam assembly and on the vernier assembly and the bases of the measuring jaws are held in these grooves so that, even when an external force in a direction intersecting to the slidable direction of the vernier acts on the measuring jaws, the measuring jaws can be reliably prevented from getting out of the related assemblies.

Still another object of the present invention is to provide a two-leg vernier calipers in which the jaws can be prevented securely from being slipped out of the main beam assembly and the vernier assembly by the force exerted in the slidable direction of the vernier, that is, by the measuring pressure through the structure that the assemblies and the jaws are fixed together by pins.

Still another object of the present invention is to provide a method of manufacturing a two-leg vernier calipers, in which the measuring jaws are fixed to the main beam assembly and the vernier assembly with their measuring surfaces set at right angles to the legs of the main beam assembly, so that a grinding and finishing of the measuring surfaces, i.e., post-assembling fitting of the measuring surfaces is rendered needless.

Still another object of the present invention is to provide a manufacturing method of a two-leg vernier calipers, in which one of the two measuring jaws is fixed to either the main beam assembly or the vernier assembly with its measuring surface set a right angles to the legs of the main beam assembly; thereafter the other of the two measuring jaws is fixed to either the vernier assembly or the main beam assembly in the state of the measuring surfaces of two measuring jaws being fitted together, thereby making the assembling work of the measuring jaws simple and exact.

Still another object of the present invention is to provide a manufacturing method of a two-leg vernier calipers, in which the measuring surfaces of the two measuring jaws are fitted together at right angles to the legs of the main beam assembly and in this state said jaws are respectively fixed to the main beam assembly and the vernier assembly, thereby making it possible to fix the measuring jaws to respective assemblies at the same time.

Still another object of the present invention is to provide a manufacturing method of a two-leg vernier calipers characterized in that the respective assemblies and measuring jaws, after fitted together, are fixed with knock-pins and a bonding agent, thereby making it possible to exactly and reliably adjust the fixing positions of the assemblies and measuring jaws.

Still another object of the present invention is to provide a manufacturing method of a two-leg vernier calipers characterized in that, when both ends of the two legs passing through the vernier assembly are connected to a first and a second stoppers to constitute the main beam assembly, the measuring jaws are respectively fixed to the first stopper and the vernier assembly, thereby making it possible to adjust the angle of the measuring surface of the main beam measuring jaw to the main beam assembly at two points, i.e. the junction of the first stopper to the legs and the junction of the main beam assembly to the measuring jaw.

Still another object of the present invention is to provide a manufacturing method of a two-leg vernier calipers characterized in that guide bushings are slidably fitted to the two legs and then the two legs are held parallel to each other in a jig; in this state each guide bushing is fixed to the vernier assembly; thus the vernier assembly is slidably supported on the two legs and at the same time both ends of the two legs are connected to the first and the second stoppers; and thereby measuring jaws separately constituted are fitted respectively to the first stopper and the vernier assembly, thus making it possible to adjust the angle of the measuring surface of the main beam jaw to the main beam assembly as two points, i.e., the junction of the first stopper to the legs and the junction of the first stopper to the main beam jaw and to adjust the angle of the measuring surface of the vernier jaw to the main beam assembly at two points, i.e., the junction between the guide bushings and the vernier assembly and the junction between the vernier assembly and the vernier measuring jaw.

Other objects and many of the attendant advantages of this invention will be readily appreciated as the same becomes better understood by reference to the following detailed description when considered in connection with the accompanying drawing.

BRIEF DESCRIPTION OF THE DRAWINGS

FIG. 1 is a plan view illustrating an embodiment according to the present invention.

FIG. 2 is a section view of the embodiment along II—II in FIG. 1.

FIG. 3 is a section view of the embodiment along III—III in FIG. 1.

DETAILED DESCRIPTION OF THE INVENTION

One embodiment of the present invention is to be described referring to the drawings.

FIG. 1 shows as one embodiment according to the present invention a vernier calipers of dial indication and digital indication, which is equipped with a pair of measuring jaws.

The present invention is not restricted to this embodiment. Any two-leg vernier caliper is included within the scope of present invention so long as it has a pair of measuring jaws.

The main beam assembly 1 therein consists of two legs 2,3 and the first stopper 4 and the second stopper 5 provided at both extremes. The legs 2, 3 are usually round bars, solid or hollow. The stoppers 4, 5 keep the two legs 2, 3 parallel to each other with a specific gap between them.

The stopper 4 of the main beam assembly 1 is attached with the measuring jaw 6 extending in normal direction to the two legs 2,3. The measuring jaw 6 is a separate body from the main beam assembly 1 which is fixed to the main beam assembly 1.

The vernier assembly 7 is slidably attached to the two legs 2,3 of the main beam assembly 1. The assembly 7 is attached with the vernier measuring jaw 8 extending in normal direction to the two legs 2,3, the jaw 8 being a separate unit from the vernier assembly 7, which is fixed to the vernier assembly 7.

7a is a dial indicator attached to the vernier assembly 7. A pinion (not shown) of the indicator 7a meshes with the rack 3a of the leg 3. 7b is a digital indicator attached to the vernier assembly 7. A pinion (not shown) of the indicator 7b also meshes with the rack 3a.

The dial indicator 7a has the similar internal mechanism as the conventional dial gauge, while the digital indicator 7b has the similar internal mechanism as the conventional counter. Details are therefore omitted here.

The main beam measuring jaw 6 and the vernier measuring jaw 8 are respectively fitted to the main beam assembly 1 and the vernier assembly 7 such as shown in FIGS. 2 and 3 that the grooves 9, 10 to hold the jaws 6, 8 are provided respectively on the main beam assembly 1 and the vernier assembly 7 (see FIGS. 2, 3); the bases of the jaws 6, 8 are placed in the grooves 9, 10; knock-pins 11 are pressed into the holes 14 running through the stopper 4 and the base of the jaw 6, while knock-pins 11' is pressed into the holes 14' running through the vernier assembly 7 and the base of the jaw 8; and thus the jaws 6, 8 are fixed to the stopper 4 and the vernier assembly 7 by means of the knock-pins 11 and a bonding agent. Thereby the grooves 9, 10 extend in the slidable direction of the vernier assembly 7. Assembling of the instrument is done in the state of the measuring surface 12 of the main beam jaw 6 and the measuring surface 13 of the vernier jaw 8 being fitted together.

Next a method of manufacturing a two-leg vernier calipers of such a constitution is to be described.

At first the two legs 2, 3 are passed through the bushings 15, 16 of the vernier assembly 7 and the stopper 5 is fixed to the ends of the legs at one side. Then, the vernier measuring jaw 8 is attached to the vernier assembly 7; and in the state of the measuring surface 13 of the vernier jaw 8 being set at right angles to the two legs 2, 3, the vernier assembly 7 and the vernier measuring jaw 8 are fixed together, say, by means of the knock-pins 11' and a bonding agent. Next, an assembly of the stopper 4 and the main beam jaw 6 as held together by means of the pins 11 and the bonding agent is attached to the two legs 2,3; and in the state of the measuring surface 12 of the jaw 6 and the measuring surface 13 of the jaw 8 being fitted together, the stopper 4 and the legs 2, 3 are immovably bonded together. By this process of assembling and fixing, the right angles between the measuring surfaces 12, 13 and the two legs 2, 3, good fit and plane contact between the measuring surfaces 12, 13 can be assured automatically in the assembled state.

Other methods of manufacturing the two-leg vernier calipers are available such as:

(1) One in which the vernier assembly 7 is slidably held on the main beam assembly 1 comprising two legs 2, 3 extending parallel to each other with a gap between them, while the main beam measuring jaw 6 and the vernier measuring jaw 8, both separately constituted from the main beam and vernier assemblies, are fixed in the grooves 9, 10 of the main beam assembly and vernier assembly, with the measuring surfaces 12, 13 set at right angles to the legs 2, 3 of the main beam assembly 1.

(2) One in which the base of the measuring jaw 6 is fitted in the groove 9 of the stopper 4 with the measuring surface 12 set at right angles to the legs of the main beam assembly 1; then the jaw 8 is fixed in the groove 10 of the vernier assembly 7 with the measuring surfaces 12, 13 of these two jaws 6, 8 fitted together, thereby fixing the two jaws 6, 8 to the main beam assembly 1 and the vernier assembly 7 with the measuring surfaces 12, 13 set at right angles to the legs 2, 3 of the main beam assembly 1.

(3) One in which the two measuring jaws 6, 8 are held in the grooves 9, 10 of the main beam assembly 1 and the vernier assembly 7 in the state of the measuring surfaces 12, 13 being fitted together and set at right angles to the two legs of the main beam assembly 1, thus fixing the two jaws 6, 8 respectively to the main beam assembly 1 and the vernier assembly 7 with their measuring surfaces 12, 13 set at right angles to the legs 2, 3 of the main beam assembly 1.

(4) One in which the measuring jaws 6, 8 are fixed with bonding agent in the grooves 9, 10 of the stopper 4 of the main beam assembly 1 and of the vernier assembly 7 with the measuring surfaces 12, 13 set at right angles to the legs; thereafter the holes 14 14' are bored running through the jaws 6, 8 and the assemblies 1,7; knock-pins 11, 11' are pressed into the holes 14, 14', and thus the jaws 6, 8 and the assemblies 1, 7 are more firmly fixed together.

(5) One in which the two ends of the two legs 2, 3 passing through the vernier assembly are connected using the first and the second stoppers 4, 5 to constitute the main beam assembly and thereby the measuring jaws 6, 8 for the main beam and vernier separately constituted are held in the grooves 9, 10 of the first stopper 4 and the vernier assembly 7, with their measuring surfaces 12, 13 set at right angles to the two legs 2, 3 of the main beam assembly 1.

The diameters of the holes 4a, 4b bored on the first stopper are designed a little larger than those of the legs 2, 3. There remain narrow gaps between the holes 4a, 4b and the legs 2,3 which allow the adjustment of the fitting inclination of the stopper 4 to the legs 2, 3 in fixing them together.

The gaps are too narrow to be illustrated in the drawing. The relationship between the holes 4a, 4b and the legs 2, 3 may be applicable to the other manufacturing methods (1)–(4) and (6) upon necessity.

(6) One in which two guide bushings 15, 16 are slidably fitted to the two legs 2, 3 and thereafter the two legs 2, 3 are held parallel to each other using a jig (not shown); in this state the guide bushings 15, 16 are bonded and fixed to the vernier assembly 7; thereby the vernier assembly 7 is slidably supported on the two legs 2, 3 and at the same time the two ends of the two legs 2, 3 are bonded and fixed together using the first and the second stoppers 4, 5; thereby the measuring jaws 6, 8 separately constituted are respectively bonded and fixed to the first stopper 4 and the vernier assembly 7, with their measuring surfaces 12, 13 set at right angles to the two legs 2, 3 of the main beam assembly 1; then holes 14, 14' are bored running through the respective jaws 6, 8 and the respective assemblies 1, 7 and thereafter knock-pins 11, 11' are pressed into the holes 14, 14' to integrate the jaws 6, 8 to the assemblies 1, 7 more firmly.

Between the guide bushings 15, 16 and the fitting-bonding portions 7c, 7c', there remain gaps similar to those between the holes of the first stopper 4 and the legs 2, 3. The gaps between the portions 7c, 7c' and the bushing 15, 16 are too narrow to be illustrated in the drawing.

According to the present invention as described above, in which the measuring jaws are constituted separately from the main beam assembly and the vernier assembly, it is possible to selectively use the measuring jaws to suit the type of instrument and accordingly to standardize the main beam assembly and the vernier assembly. This makes it possible to fabricate the main beam assembly or the vernier assembly of cheap materials like aluminum and at the same time to fabricate only the measuring jaws of an anti-wear stainless material. Thus the traditional idea of attempting to reduce the cost through fabrication of only the measuring surfaces of a high-strength material is automatically realized.

In the present invention, in which grooves are provided on the main beam assembly and the vernier assembly, extending in the slidable direction of the vernier assembly and the bases of the measuring jaws are held in the grooves, it is possible to reliably prevent the measuring jaws from getting out of respective assemblies even when an external force acts on the jaws in a direction intersecting to the movable direction of the vernier assembly.

Further, since the respective assemblies and the respective jaws are fixed by means of knock-pins, in the present invention it is possible to reliably prevent the jaws from being separated from the respective assemblies by a measuring pressure, i.e., a force acting in the movable direction of the vernier assembly.

Further, according to the manufacturing method of the present invention, in which the measuring jaws are fixed to the main beam assembly and the vernier assembly with their measuring surfaces set at right angles to the main beam assembly, it is possible to omit the measuring surface-fitting work after assembling of instrument, i.e., a grinding of measuring surface.

Further when one of the two measuring jaws is fixed to the main beam assembly or the vernier assembly with its measuring surface set at right angles to the legs of the main beam assembly and then the other jaw is fixed to the vernier assembly or the main beam assembly with their measuring surfaces fitted together, it is possible to make the work of assembling the jaws in the instrument simpler and more exact.

Further, when the two measuring jaws are fixed respectively to the main beam assembly and the vernier assembly in the state of their measuring surfaces being fitted together at right angles to the legs of the main beam assembly, it is possible to fasten the jaws to the respective assemblies in one action.

Further when knock-pins are applied after bonding and fixing of the assemblies and the jaws with the measuring surfaces set at right angles to the legs of the main beam assembly, it is possible to make a reliable and exact adjustment of the assembled positions of the assemblies and the jaws.

Further when the jaws are respectively fixed to the first stopper and the vernier assembly in constituting the main beam assembly by connecting the two ends of the two legs by means of the first and the second stoppers, it is possible to adjust the angle of the measuring surface of the main beam measuring jaw to the legs of the main beam assembly at two points, i.e., the junction between the first stopper and the leg and the junction between the main beam assembly and the measuring jaw.

Further when guide bushings are slidably fitted to the two legs and thereafter, in the state of the two legs being held parallel to each other in a jig, the guide bushings are bonded and fixed to the vernier assembly and thereby the vernier assembly is slidably supported on the two legs, with the two ends of the two legs fixed to the first and the second stoppers and then to the first stopper and the vernier assembly the measuring jaws separately constituted therefrom are respectively attached,—it is possible then to adjust the angle of the measuring surface to the main beam measuring jaw to the main beam assembly at two points, i.e., the junction between the first stopper and the legs and the junction between the first stopper and the main beam measuring jaw; and to adjust the angle of the measuring surface of the vernier measuring jaw to the main beam assembly at two points, i.e., the junction between the guide bushings and the vernier assembly and the junction between the vernier assembly and the vernier measuring jaw.

What is claimed is:

1. A method of manufacturing vernier calipers wherein the vernier calipers have two parallel legs with a space therebetween, which legs slidably support a vernier thereon that carries one jaw of a pair of opposed measuring jaws, the other jaw being fixed on the parallel legs by a stop, the method comprising the steps of:
sliding a bushing over each leg;

fabricating a vernier which is U-shaped in cross-section to define a longitudinally extending slot therein;

sliding the vernier over each bushing and bonding the vernier to the bushings with the bushings laterally spaced from one another and with the slot extending past the bushings to define a groove wherein the vernier and bushings form a unit which slides longitudinally on the parallel legs with the groove opening laterally thereof;

bonding the parallel legs at one end to a first stop;

fabricating a second stop having bores for receiving the parallel legs and a longitudinally extending groove;

bonding the parallel legs in the bores of the second stop while the stop is positioned with the groove opening in the same direction as the groove defined by the slot of the vernier;

fabricating the jaws as separate first and second pieces each jaw having a planar measuring surface and a positioning surface extending generally orthogonally to the measuring surface;

inserting the positioning end of the first jaw into one of the slots and positioning the jaw so that the measuring surface extends at a right angle to the pair of parallel legs;

bonding the inserted first jaw within the slot;

drilling a pair of longitudinally spaced holes through the walls of the slot and the first jaw;

inserting securing pins within the holes;

inserting the positioning end of the second jaw within the other slot with the measuring surface in abutment with and parallel to the measuring surface of the first jaw;

bonding the second jaw within the other slot;

drilling a pair of longitudinally spaced holes through the walls of the other slot and through the second jaw, and inserting securing pins within the holes to reinforce the joint between the second jaw and the other slot whereby the measuring surface of the second jaw is both parallel to the first jaw and perpendicular to the pair of parallel legs.

2. The method of claim 1 wherein the first jaw is inserted into the second stop and the second jaw is inserted into the vernier.

3. The method of claim 2 wherein the legs, stops and vernier are made of aluminum while the first and second jaws are made of an anti-wear stainless material.

* * * * *